US010104956B2

(12) United States Patent
Bergmann et al.

(10) Patent No.: US 10,104,956 B2
(45) Date of Patent: Oct. 23, 2018

(54) CONNECTING DEVICE FOR CONNECTING A TABLE LEG TO A TABLE LEAF

(71) Applicant: WALTER KNOLL AG & CO. KG, Herrenberg (DE)

(72) Inventors: Martin Bergmann, Vienna (AT); Gernot Bohmann, Vienna (AT); Harald Gruendl, Vienna (AT); Juergen Roehm, Leinfelden-Echterdingen (DE); Rainer Brinkmann, Gerlingen (DE)

(73) Assignee: WALTER KNOLL AG & CO. KG, Herrenberg (DE)

( * ) Notice: Subject to any disclaimer, the term of this patent is extended or adjusted under 35 U.S.C. 154(b) by 0 days.

(21) Appl. No.: 15/611,392

(22) Filed: Jun. 1, 2017

(65) Prior Publication Data

US 2017/0347792 A1   Dec. 7, 2017

(30) Foreign Application Priority Data

Jun. 2, 2016   (DE) .................. 10 2016 110 254

(51) Int. Cl.
*A47B 13/02*          (2006.01)
*A47B 13/00*          (2006.01)
(Continued)

(52) U.S. Cl.
CPC .......... *A47B 13/003* (2013.01); *A47B 13/02* (2013.01); *A47B 13/021* (2013.01); *F16B 2/12* (2013.01);
(Continued)

(58) Field of Classification Search
CPC ............... A47B 13/003; A47B 13/021; A47B 2013/022; A47B 13/02; F16B 12/48;
(Continued)

(56) References Cited

U.S. PATENT DOCUMENTS

| 4,186,976 A | * | 2/1980 | Okada .................. | A47B 17/003 312/111 |
| 5,934,630 A | * | 8/1999 | Williams ............. | A47B 13/003 248/188 |
| 2009/0183657 A1 | * | 7/2009 | Fischer ................ | A47B 13/021 108/156 |

FOREIGN PATENT DOCUMENTS

| DE | 1 792 729 | 7/1959 |
| DE | 299 14 651 U1 | 12/1999 |

(Continued)

*Primary Examiner* — Eret C McNichols
(74) *Attorney, Agent, or Firm* — Schroeder Intellectual Property Law Group, LLC

(57) ABSTRACT

A connecting device for connecting a table leg to a table leaf having a back-gripping element, which can be disposed on the table leaf and has an engagement hole and a locking device, which can be disposed on the table leg. The locking device has a clamping element having an engagement hook which is designed to engage the engagement hole of the back-gripping element, a spring element, which is supported at least indirectly against the clamping element and at least indirectly against a spring abutment, and an actuating element. The actuating element acts on the spring abutment so that, in a locking position, the spring abutment applies sufficient force to secure the engagement hook of the clamping element in the engagement hole, and in an unlocking position, the spring abutment is in a position in which the spring element is at least partially unloaded in relation to the locking position.

11 Claims, 3 Drawing Sheets

(51) Int. Cl.
*F16B 45/04* (2006.01)
*F16B 2/18* (2006.01)
*F16B 2/12* (2006.01)
*F16B 12/10* (2006.01)
*F16B 12/52* (2006.01)
*F16B 12/44* (2006.01)
*F16B 12/48* (2006.01)

(52) U.S. Cl.
CPC .............. *F16B 2/185* (2013.01); *F16B 12/10* (2013.01); *F16B 45/04* (2013.01); *A47B 2013/022* (2013.01); *F16B 12/44* (2013.01); *F16B 12/48* (2013.01); *F16B 12/52* (2013.01)

(58) Field of Classification Search
CPC .. F16B 12/44; F16B 12/52; F16B 2/12; F16B 2/185; F16B 12/10; F16B 45/04
See application file for complete search history.

(56) References Cited

FOREIGN PATENT DOCUMENTS

| | | |
|---|---|---|
| DE | 10 2006 050 677 A1 | 4/2008 |
| DE | 20 2008 005 614 U1 | 10/2009 |
| DE | 10 2010 047 502 A1 | 4/2012 |
| EP | 1 915 923 A2 | 4/2008 |
| FR | 2 805 866 A1 | 9/2001 |
| WO | WO 0160203 A1 * | 8/2001 ........... A47B 13/021 |

\* cited by examiner

CONNECTING DEVICE FOR CONNECTING A TABLE LEG TO A TABLE LEAF

RELATED APPLICATIONS

The present application claims priority to German Application No. 10 2016 110 254.7 filed Jun. 2, 2016—the contents of which are fully incorporated herein by reference.

BACKGROUND OF THE INVENTION

1. Field of the Invention

The invention relates to a connecting device for connecting a table leg to a table leaf, which connecting device has:
a) a back-gripping element, which is configured or can be disposed in or on the table leaf and has an engagement hole,
b) a locking device, which is configured or can be disposed in or on the table leg, comprising
   a clamping element, having an engagement hook which is designed to engage in the engagement hole of the back-gripping element,
   a spring element, which is supported, on the one hand, at least indirectly against the clamping element and, on the other hand, at least indirectly against a spring abutment,
   and
   an actuating element.

2. Description of the Prior Art

Such connecting devices, for storing a large number of table leaves together with the associated table legs in a space-efficient manner, are known. In addition, such connecting devices are known also for so-called conference table systems, in which respectively two table leaves are connected to each other via a table leg. Thus EP 1 915 923 B1, for instance, discloses a table leg in which the clamping element, in order to unlock an actuating element against the action of the spring element—releasing the clamping—is moved back.

It has been shown, however, that, for operability reasons, a different mechanical solution for the locking and unlocking would be desirable.

SUMMARY OF THE INVENTION

An object of the present invention is therefore to define a connecting device stated in the introduction which is improved with respect to its locking and unlocking mechanism. According to the invention, this may be achieved by a connecting device of the type stated in the introduction, in which
c) the actuating element acts at least indirectly on the spring abutment such that
   in a locking position, the spring abutment is in a position in which the spring element applies sufficient force to secure the engagement hook of the clamping element in the engagement hole of the back-gripping element, and such that
   in an unlocking position, the spring abutment is in a position in which the spring element is at least partially unloaded in relation to the locking position.

The inventors have recognized that, instead of moving the clamping element by means of the actuating element counter to the spring action of the spring element, it is also possible to move the spring abutment against which that side of the spring element which is facing away from the clamping element is supported. For the unlocking, the spring element is hence unload instead of, as previously, tensioned. With regard to the potential spring energy, the locking device is thus in the unlocking position in a lower energy state than in the locking position. Consequently, the locking position is not at an energy maximum, thereby ensuring that the unlocking position is also held. Nevertheless, as a result of the spring action, the clamping element can "[work]" with respect to the engagement hole to compensate, for instance, for slight difficulties of fit, or to react to vibrations of the table leaf. The spring force must here be sufficient to absorb the forces which are typically generated when the table leaf is subjected to stress, without the engagement hook being able to escape from the engagement hole.

Although the illustrative embodiment is shown only with reference to a compression spring, according to the invention a locking device having a tension spring or other types of spring elements is also conceivable. The spring abutment should thus be seen as an appropriate support also with respect to the tension spring. Furthermore, the spring abutment can also be integrally connected to the spring element, for instance as a more thickly constructed last coil of a spring. In addition, locking devices which, within the mechanical action chain, in relation to them elements cited in the claims, have additional components as intermediate components, are also covered according to the invention.

Even though the connecting device is here shown only in a linear form, the inventive concept is also transferable to a mechanical action chain which operates, for instance, with a rotating clamping element. This can also relate only to parts of the mechanical action chain, so that, for instance, the actuating element can be constructed as a tilt lever, or else as a rotary lever.

The back-gripping element will typically be configured as a metallic plate, which is arranged over a corresponding recess on the table leaf. It is also conceivable, however, for the engagement hole to be provided by a milled recess directly on the table leaf.

Preferably, the actuating element, in the shift into the unlocking position, acts at least indirectly on the clamping element such that the clamping element, after the unloading of the spring element, is moved, in particular displaced, counter to the clamping direction. As a result, the engagement hook is reliably released from its back-gripping engagement in the engagement hole. This can be happen, for instance, by virtue of the fact that the spring abutment, at the end of its movement in the spring action direction, acts on a driver, which either is directly provided on the clamping element, or at least acts indirectly on this same, so that the clamping element is displaced counter to the clamping direction.

Advantageously, the actuating element is connected to the spring abutment via an articulated lever mechanism. an articulated lever mechanism allows in a simple manner a redirection of the movement of the actuating element into a movement of the spring abutment and/or of the clamping element along and counter to the clamping direction of the clamping element.

Advantageously, the actuating element is mounted rotatably about an actuation axis and the articulated lever mechanism comprises an intermediate member which is pivotably connected to the actuating element and the spring rest, whereby between the actuating element and the intermediate member is defined a first articulation axis and between the intermediate member and the spring abutment is defined a second articulation axis. In this way, in an actuating element configured as a tilt lever, a pivot movement of a part of the actuating element that projects over the actuation axis can be redirected, for instance, into a lifting movement of the spring abutment.

Preferably, the actuation axis, the first articulation axis and the second articulation axis run parallel to one another. The first articulation axis, in the locking position, can come to lie on one side of an imaginary connecting axis from the actuation axis to the second articulation axis. In the unlocking position, the first articulation axis can then come to lie on the other side of the imaginary connecting axis. This can gives rise to a self-locking mechanism, which ensures that the locking device, in the shift from the locking position into the unlocking position, must be moved over a dead center, i.e. over an energetic intermediate maximum. In this way, the locking position is secure, since the articulated lever mechanism cannot make its way into the unlocking position of its own accord, that is to say due to a force effect deriving from the clamping element. In this respect, the spring element fulfils a dual function: on the one hand, it compensates, in the locking position, for tolerances with respect to the clamping of the engagement hook; on the other hand, the spring element provides a spring travel for overcoming the dead center of the articulated lever mechanism. Of course, this last notion is also applicable to other types of locking mechanisms, not constructed as articulated lever mechanisms, in which a dead center has likewise to be overcome.

Preferably, the locking device has a latching element, which, in the unlocking position, cooperates with the clamping element such that the actuating element can be moved out of the unlocking position only under a defined force expenditure on the part of a user. In this way, it is ensured that the engagement hook remains in a position in which it can be inserted without difficulty into the corresponding engagement hole of the back-gripping element. As a result, the table leg can be fastened to the table leaf without risk of tilting. Advantageously, a component which has a stop for the clamping element, as well as an axis of symmetry, such that, with respect to the axis of symmetry, two latching zones are provided, can here be used as the latching element. As a result, identically shaped latching element, as will yet become clear further below, can be used both for a left-handed and for a right-handed locking device.

Preferably, the connecting device has two locking devices with separate actuating elements. In this way, a connecting device can extend over the margins of two table leaves, so that a conference table system can be constructed. For details relating to the concept of a conference table system, reference should be made to EP 1 915 923 B1 (cited in the introduction).

Preferably, the back-gripping element has two engagement holes, wherein an engagement hole has perpendicular to the clamping direction of the clamping element a larger, in particular roughly twice as large dimension, than the engagement hook of the clamping element. In particular, the larger engagement hole, in that state of the back-gripping element in which it is attached to the table leaf, can lie closer to the table edge. In this way, in a conference table system, a table leg can be attached with two locking devices at the junction of two table leaves. On both table leaves, the elongate engagement holes which lie closer to the table edge are here used for the hooking engagement. If the table leg, however, in the event of isolation of a table or at the end of a conference table, is intended to be fastened to an individual table leaf, then, using the single hole and the long hole, the table leg can be fitted such that it is offset further inward, which is visually desirable, without a further set of engagement holes having to be provided for this purpose.

Using appropriate back-gripping elements, corner-to-corner positions of the conference table system can in this way also, of course, be realized.

Although the connecting device is mostly used only to connect a table leg to a table leaf and is therefore also described in this regard, the invention also covers, of course, connecting devices, which generally connects furniture elements to other furniture parts, for instance a seat bench to its feet or a container on the underside of a table leaf.

Other advantages and aspects of the present invention will become apparent upon reading the following description of the drawings and detailed description of the invention.

BRIEF DESCRIPTION OF THE DRAWINGS

Illustrative embodiments of the invention are explained in greater detail below with reference to the drawings, in which.

DESCRIPTION OF A PREFERRED
ILLUSTRATIVE EMBODIMENT

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

Figure 1:
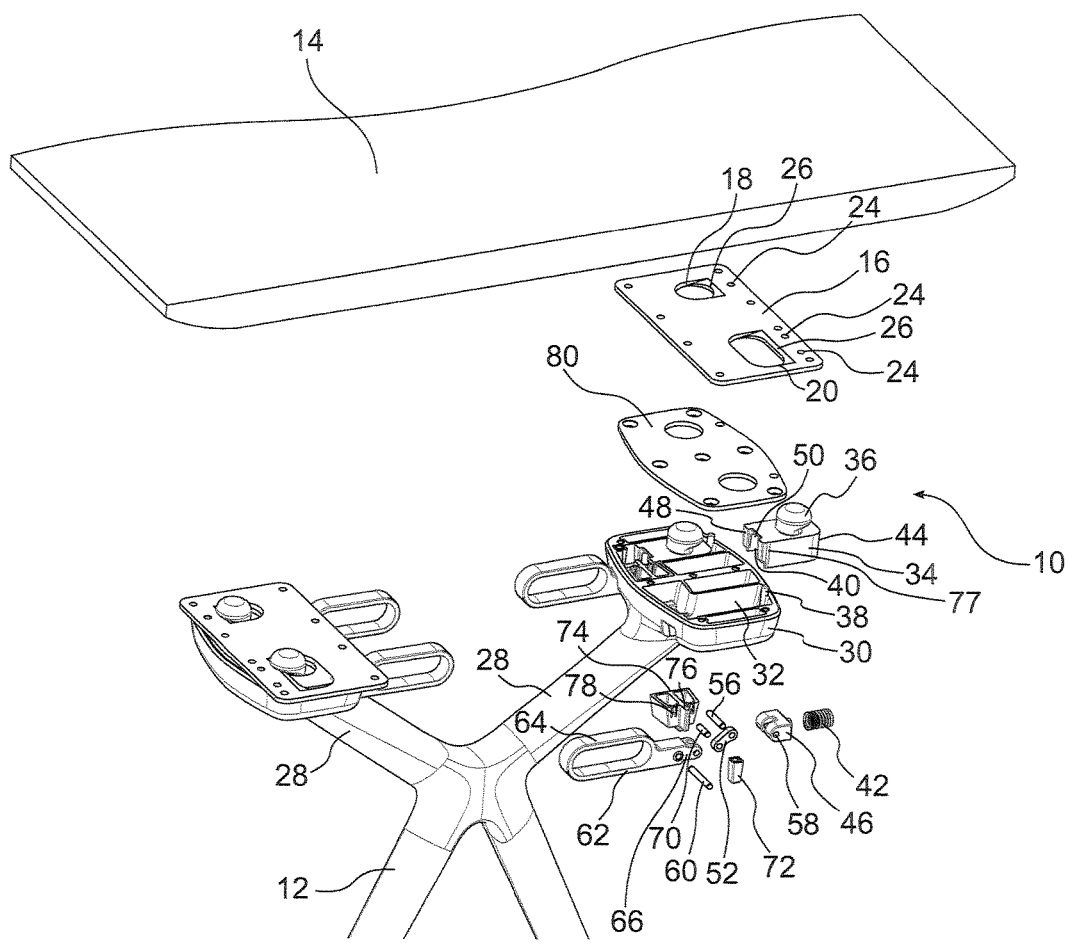
FIG. 1 shows a perspective exploded representation of a connecting device according to the invention for connecting a table leg to a table leaf, which connecting device has an actuatable locking device.

FIG. 1 shows a connecting device, provided in its entirety with the reference symbol 10, for connecting a table leg 12, here of substantially cruciform configuration, to a table leaf 14.

The connecting device 10 comprises as the back-gripping element a roughly rectangular metal plate 16, which has an engagement hole 18 and an, in the longitudinal direction of the table leaf 14, elongate engagement hole 20. The metal plate 16 is bolted from below onto the table leaf 14 and covers a recess 22 (cf. FIGS. 2 to 4) in the table leaf 14, wherein the metal plate 16 itself is flush-mounted in the table leaf 14 such that the underside of the metal plate 16 is aligned with the underside of the table leaf 14.

The metal plate 16 further has three pinholes 24, the significance of which later becomes clear.

The engagement holes 18 and 20 further have lead-in bevels 26, oriented toward the table leaf 14.

The x-shaped table leg 12 has on its upper supporting arms 28 respectively a receiving tray 30, which receives the basic elements of the connecting device 10 which are disposed on the table leg 12.

In the receiving tray 30 are provided two running gaps 32, in which respectively a clamping element 34, configured as a slide, is displaceably mounted. The clamping element 34 has on its top side an engagement hook 36. As can be seen from the sectional views of FIGS. 2 to 4, the latch-in hook 36 of the respective clamping elements 34 is designed such that it can engage in the engagement holes 18 and 20 and, in the case of a position shown on the right in the sectional drawings, back-grips the metal plate 16, so that the corresponding table leg 12 is secured to the table leaf 14. To this end, the engagement hook 36 has a slimmer portion that supports a portion which here projects toward the outer side of the table leaf 14 and which comes to lie on the lead-in bevels 26 of the engagement holes 18, 20.

A locating pin 38 which is respectively disposed in extension of the running gaps 32 on the receiving tray 30 ensures, together with the pinholes 24, an exact positioning of the table leg 12 with respect to the table leaf 14, and a corresponding counter bearing to the engagement hook 36 of the respective clamping element 34 on the table leaf 14.

The clamping element 34 further has on its underside a recess 40, in which is disposed a compression spring 42 as the spring element. The compression spring 42 bears with one spring side (situated on the right in the sectional views) against an end wall 44 of the clamping element 34. The direction pointing from the compression spring 42 to the end wall 44 defines the clamping direction of the clamping element 34. With the other spring side, the compression spring 42, by contrast, bears against a spring stop 46, disposed in the recess 40, as the spring abutment, which spring stop is movable in the recess 40 in the same direction as the clamping element 34 itself.

A further end wall 48 of the clamping element 34 here limits the movement of the spring stop 46 within the recess 40 counter to the clamping direction. This end wall 48 has, however, a central aperture 50, through which an intermediate member 52 of an articulated lever mechanism reaches in order to displace the spring stop 46. On the side situated in the recess 40, the intermediate member 52 is here pivotably connected to hinge eyelets 58 of the spring stop 46 via a hinge pin 56.

Somewhat beneath the running plane of the spring stop 46 and of the hinge eyelets 56 is disposed a supporting pin 60, which supports a pivotable tilt lever 62 as the actuating element. The tilt lever 62 has a grip region 64 and a work arm 66 projecting over the supporting pin 60, and is shaped such that it can be moved between a locking position (FIG. 2), in which the tilt lever 62 lies substantially parallel to the table leaf 14, and an unlocking position (FIG. 4), in which the tilt lever 62 stands substantially perpendicular to the table leaf 14.

The work arm 66 of the tilt lever 62 likewise has hinge eyelets, in which a further hinge pin 70 engages in order to connect the tilt lever 62 pivotably to the intermediate member 52.

The spring stop 46, the intermediate member 52 and the tilt lever 62 thus form the articulated lever mechanism, the working method of which is described in greater detail further below.

For the fixing of the supporting pin 60 in the receiving tray 30 at the end of the running gaps 32 are provided a smaller holding block 72 and a somewhat larger latching block 74, which, after the other components have been mounted in the receiving tray 30, are pressed from above onto the supporting pin 60. The latching block 74 here has a clamping element stop 76, which in the installed state runs perpendicularly downward and against which the clamping element 34 butts in the unlocking position. Latching tongues 78 on both sides of the clamping element stop 76 here cooperate with a respective groove 77 on the side walls of the clamping element 34 and ensure that the tilt lever 62 can be moved out of the full unlocking position only under a predefined force expenditure. Both the latching block 74 and the clamping element 34 are configured as symmetrical components, so that, according to for which of the two running gaps 32 the latching block 74 and the clamping element 34 with its grooves 77 is used, either the one or the other latching tongue 78, and associated groove 77, is employed.

Lastly, the receiving tray 30, in which all those components of the connecting device 10 which are provided on the table leg 12 are disposed, is closed to the table leaf 14 by a cover plate 80, through which only the locating pins 38 and the engagement hook 36 pass.

Figure 2:
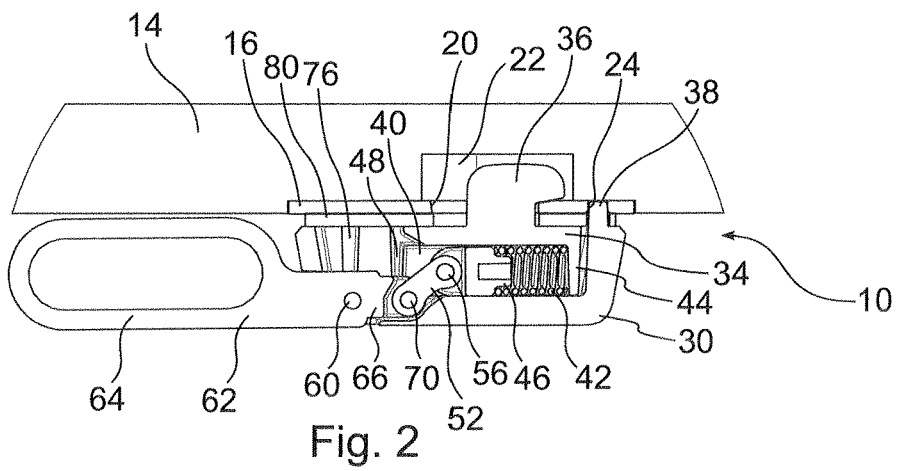
FIG. 2 shows a sectional view through the connecting device, with the locking device in a locking position.
Figure 3:
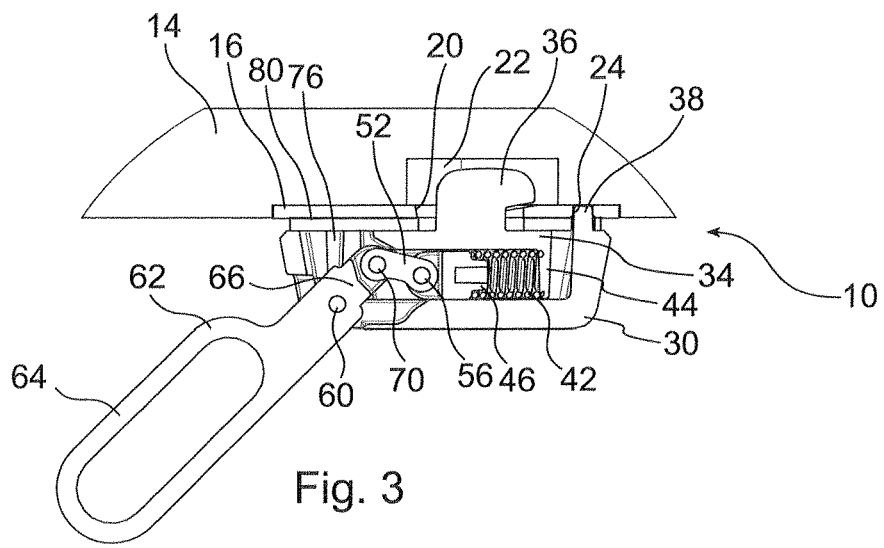
FIG. 3 shows a sectional view through the connecting device, with the locking device in a half-opened position.

The connecting device 10 works as follows:

If the tilt lever 62, as shown in FIG. 2, is in the locking position, then the compression spring 42, which is supported against the spring stop 46, presses the clamping element 34 in the clamping direction. The spring stop 46 is here pressed by the compression spring 42 in the direction of the tilt lever 62. However, the articulation axis of the articulated lever mechanism, which is defined by the hinge pin 70, lies beneath an imaginary line between the actuation axis defined by the supporting pin 60 and a second articulation axis defined by the hinge pin 56. The tilt lever 62 is hence pressed still more strongly into the locking position, so that the locking device is self-locking.

In the shift (shown in FIG. 3) into the unlocking position, the pivot movement of the tilt lever causes the articulation axis of the articulated lever mechanism to switch to the other side of the imaginary line. The spring stop 46 must here be moved a short distance against the spring force of the compression spring 42. After this, the spring stop 46 yields, so that the compression spring 42 is unloaded.

Figure 4:
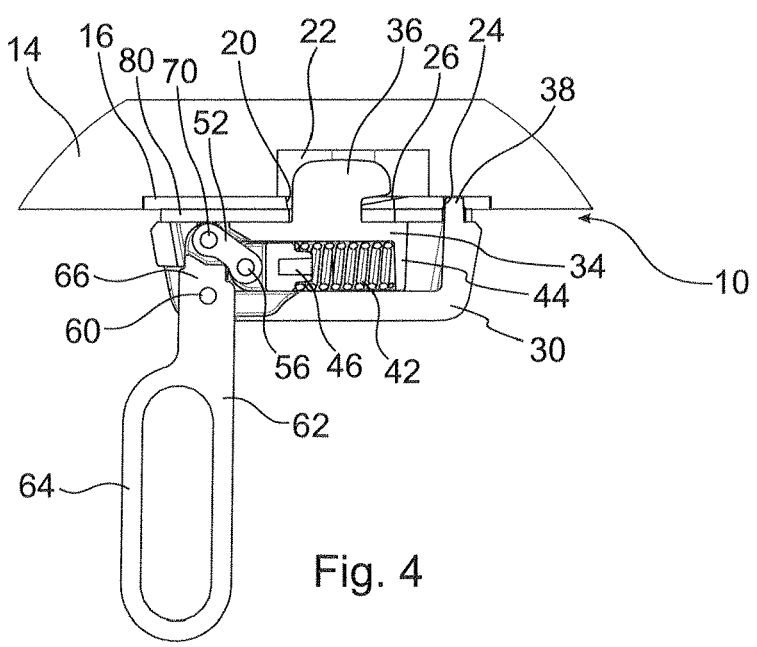
FIG. 4 shows a sectional view through the connecting device, with the locking device in an unlocking position.

In the unlocking position shown in FIG. 4, the tilt lever 62 bears against the tilt lever stop 76. In the last travel section, the clamping element 34 has here been moved by the spring stop 46, after the compression spring 42 has been unloaded, counter to the clamping direction, since the spring stop 46 butts against that end wall 48 of the clamping element 34 which is present around the central breach 50. The end wall 48 thus serves as a driver for the clamping element 34. The engagement hook 36 thereby vacates the corresponding engagement hole 18, 20, so that the connection of table leg 12 and table leaf 14 can be undone.

Figure 5:
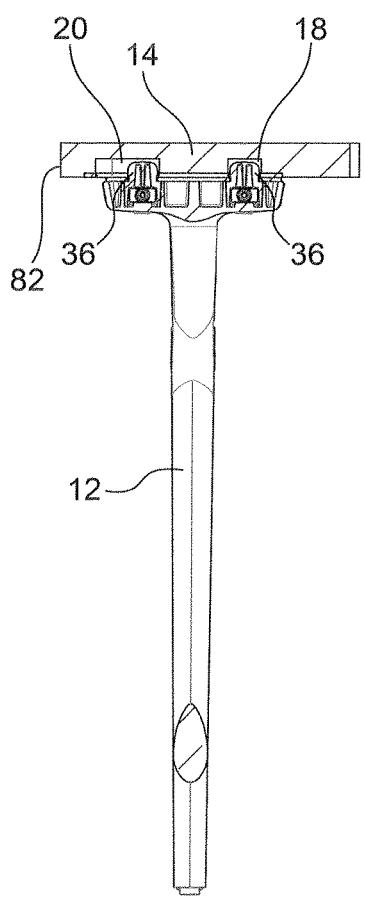
FIG. 5 shows a cross-sectional view through a table leg having the connecting device according to the direction, wherein the table leg is fastened to an individual table leaf.
Figure 6:
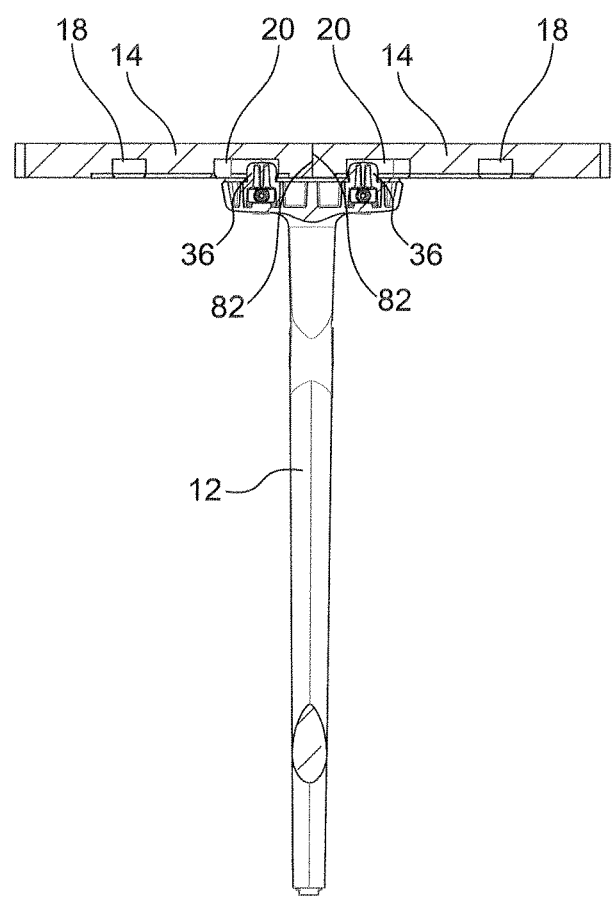
FIG. 6 shows a cross-sectional view through a table leg having the connecting device according to the invention, wherein the table leg is fastened to two table leaves.

Finally, with reference to FIGS. 5 and 6, the connection situation on a conference table system also becomes clear. The figures here show cross sections which go through the engagement holes 18 and 20.

In the connection of a table leg to just one table leaf 14 (cf. FIG. 5), the two engagement hooks 36 of a connecting device 10 engage in the shorter engagement hole 18, which is further remote from the table edge 82 which is here situated on the left, and in that region of the elongate engagement hole 20 which is further remote from the table edge 82.

In the connection of a table leg to two table leaves 14 (cf. FIG. 6), the two engagement hooks 36 of a connecting device 10 respectively engage in those regions of the elongate engagement holes 20 which lie closer to the table edges 82. In this way, long conference tables can be assembled from identical table legs 12 and table leaves 14.

While in the foregoing there has been set forth various embodiments of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

We claim:

1. A connecting device for connecting a table leg to a table leaf, the connecting device comprising:
   a) a back-gripping element, which is configured to be disposed in or on the table leaf and has an engagement hole,
   b) a locking device, which is configured to be disposed in or on the table leg, the locking device comprising
      a clamping element, having an engagement hook which is designed to engage in the engagement hole of the back-gripping element,
      a spring element which is supported at least indirectly against the clamping element and also at least indirectly against a spring abutment,
      and
      an actuating element,
   wherein
   c) the actuating element acts at least indirectly on the spring abutment such that
      in a locking position, the spring abutment is in a position in which the spring element applies sufficient force to secure the engagement hook of the clamping element in the engagement hole of the back-gripping element, and such that
      in an unlocking position, in which the locking device is still connected with the table leaf, the spring abutment is in a position in which the spring element is at least partially unloaded in relation to the locking position, in order to allow disengagement of the engagement hook from the engagement hole of the back-gripping element.

2. The connecting device according to claim 1, wherein the actuating element, in the shift into the unlocking position, acts at least indirectly on the clamping element such that the clamping element, after the unloading of the spring element, is moved counter to a clamping direction.

3. The connecting device according to claim 1, wherein the actuating element is connected to the spring abutment via an articulated lever mechanism.

4. The connecting device according to claim 3, wherein the actuating element is mounted rotatably about an actuation axis and the articulated lever mechanism comprises an intermediate member, which is pivotably connected to the actuating element and the spring rest, whereby a first articulation axis is defined between the actuating element and the intermediate member and a second articulation axis is defined between the intermediate member and the spring abutment.

5. The connecting device according to claim 4, wherein the actuation axis, the first articulation axis and the second articulation axis run parallel to one another, and the first articulation axis
   a) lays on one side of an imaginary connecting axis from the actuation axis to the second articulation axis in the locking position, and
   b) lays on the other side of the imaginary connecting axis in the unlocking position.

6. The connecting device according to claim 1, wherein the locking device has a latching element, which, in the unlocking position, cooperates with the clamping element such that the actuating element can be moved out of the unlocking position when a threshold force is applied to the actuating element.

7. The connecting device according to claim 1, wherein the connecting device has two locking devices with separate actuating elements.

8. The connecting device according to claim 1, wherein the back-gripping element has two engagement holes, wherein at least one of the two engagement holes has a larger dimension than the engagement hook of the clamping element, the larger dimension being in a direction perpendicular to the clamping direction of the clamping element.

9. The connecting device according to claim 8, wherein the larger dimension is twice as large as the engagement hook of the clamping element.

10. The connecting device according to claim 1, wherein the engagement hook is orientated in a direction facing the spring element.

11. A connecting device for connecting a table leg to a table leaf, the connecting device comprising:
    a) a back-gripping element, which is configured to be disposed in or on the table leaf and has an engagement hole and a recess,
    b) a locking device, which is configured to be disposed in or on the table leg, the locking device comprising
       a clamping element, having an engagement hook which is designed to enter the recess and engage in the engagement hole of the back-gripping element,
       a spring element which is supported at least indirectly against the clamping element and also at least indirectly against a spring abutment,
       and
       an actuating element,
    wherein
    c) the actuating element acts at least indirectly on the spring abutment such that
       in a locking position, the spring abutment is in a position in which the spring element applies sufficient force to secure the engagement hook of the clamping element in the engagement hole of the back-gripping element, and such that
       in an unlocking position of the back-gripping element and the spring abutment is in a position in which the spring element is at least partially unloaded in relation to the locking position while the engagement hook of the clamping element still remains in the recess.

* * * * *